United States Patent [19]
Gordon, Sr.

[11] Patent Number: 5,922,064
[45] Date of Patent: Jul. 13, 1999

[54] OIL AND GAS WELL SEPARATION APPARATUS

[76] Inventor: Ellison T. Gordon, Sr., P.O. Box 836, Covington, La. 70434

[21] Appl. No.: 08/851,792

[22] Filed: May 6, 1997

[51] Int. Cl.$^6$ .................................................. C02F 1/40
[52] U.S. Cl. ......................... 710/519; 210/521; 210/522; 210/539; 210/540
[58] Field of Search ................................ 210/519, 521, 210/522, 539, 540, 0.35, 252, 256

[56] References Cited

U.S. PATENT DOCUMENTS

| | | | |
|---|---|---|---|
| 691,365 | 1/1902 | Dittler | 210/539 |
| 745,519 | 12/1903 | Pravicha et al. | 210/521 |
| 1,647,344 | 11/1927 | Cushman | 210/540 |
| 2,793,186 | 5/1957 | Dunell et al. | 210/521 |
| 3,762,548 | 10/1973 | McCabe | 210/540 |
| 3,849,311 | 11/1974 | Jakubek | 210/521 |
| 4,390,421 | 6/1983 | Hammerschmitt | 210/522 |
| 4,554,074 | 11/1985 | Broughton | 210/540 |
| 4,915,823 | 4/1990 | Hall | 210/521 |
| 4,994,179 | 2/1991 | Keeter et al. | 210/540 |
| 5,340,477 | 8/1994 | Simon | 210/539 |

FOREIGN PATENT DOCUMENTS 5340  2/1892  United Kingdom .

*Primary Examiner*—Christopher Upton
*Attorney, Agent, or Firm*—Garvey, Smith, Nehrbass & Doody, L.L.C.

[57] ABSTRACT

An oil and water separation apparatus includes a pair of spaced apart vessels, the first vessel having an interior for holding liquid and a separator unit that is positioned in the interior of the first vessel. The separator unit receives incoming flow at its upper end portion. This flow fills the interior of the separator. The inclined walls of the separator help accumulate oil that moves upwardly therewithin. Lowermost pipes discharge water from the separator. A plurality of vertically spaced apart conduits are positioned around the exterior wall of the separator and communicate with its interior. Each of the vertical openings has a larger cross sectional area base portion and a smaller cross sectional area top through which oil can exit. Accumulated oil can be channeled away from recycling. Water escaping the first vessel enters the second vessel where it encounters a plurality of alternating baffles and filters that further clarify any water that is discharged from the first vessel. Additional filtration units can be positioned down stream of the second vessel for removing any trace amounts of waste product that are affluent from the second vessel.

11 Claims, 3 Drawing Sheets

OIL AND GAS WELL SEPARATION APPARATUS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the treatment of waste water, and more particularly, to the treatment of a waste water stream that includes oil, water and gas. More particularly, the present invention relates to an improved oil/water separating system that provides a vessel having an interior that can be filled with liquid and a separator that is immersed in the liquid within the vessel, the separator having a conically shaped wall that funnels and accumulates oil as it moves upwardly and wherein numerous vertical conduits arranged about the wall of the separator channel collected oil upwardly, each of the vertical conduits being wider at the base than at the top.

2. General Background of the Invention

The treatment of waste water that contains oil is a complex problem that is more complicated when very high volumes of waste water flow are involved.

SUMMARY OF THE INVENTION

The present invention provides an improved oil and water separation system that can be used to treat high volumes of waste water wherein the separator oil can be reclaimed for recycling.

The apparatus of the present invention includes a first vessel having an interior for holding liquid, a flow inlet and a flow outlet.

A second vessel is spaced from the first vessel and has an interior for holding liquid, a flow inlet and a flow outlet. The flow inlet of the second vessel communicates with the flow outlet of the first vessel so that effluent from the first vessel enters the second vessel.

A separating unit is immersed in the interior of the first vessel, being surrounded by fluid that is contained within the interior of the first vessel.

The separated fluid receives oil containing waste water from the incoming flow line by communicating at its upper end with the incoming flow line.

The separator unit is preferably cone shaped, having a plurality of inclined wall portions that have a plurality of openings. Openings include vertically and circumferentially spaced vertical conduit openings positioned on the inclined wall. The majority of the openings are positioned below the upper inlet portion of the separator unit.

Oil and water can stratify within the interior of the first vessel and likewise within the interior of the separator unit. The combination of the inclined walls of the separator unit and the gradually decreasing area of the conduits functions to stratify oil contained within the interior of the separator unit and to accumulate and thicken oil as it moves upwardly in the separator unit toward recycling.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
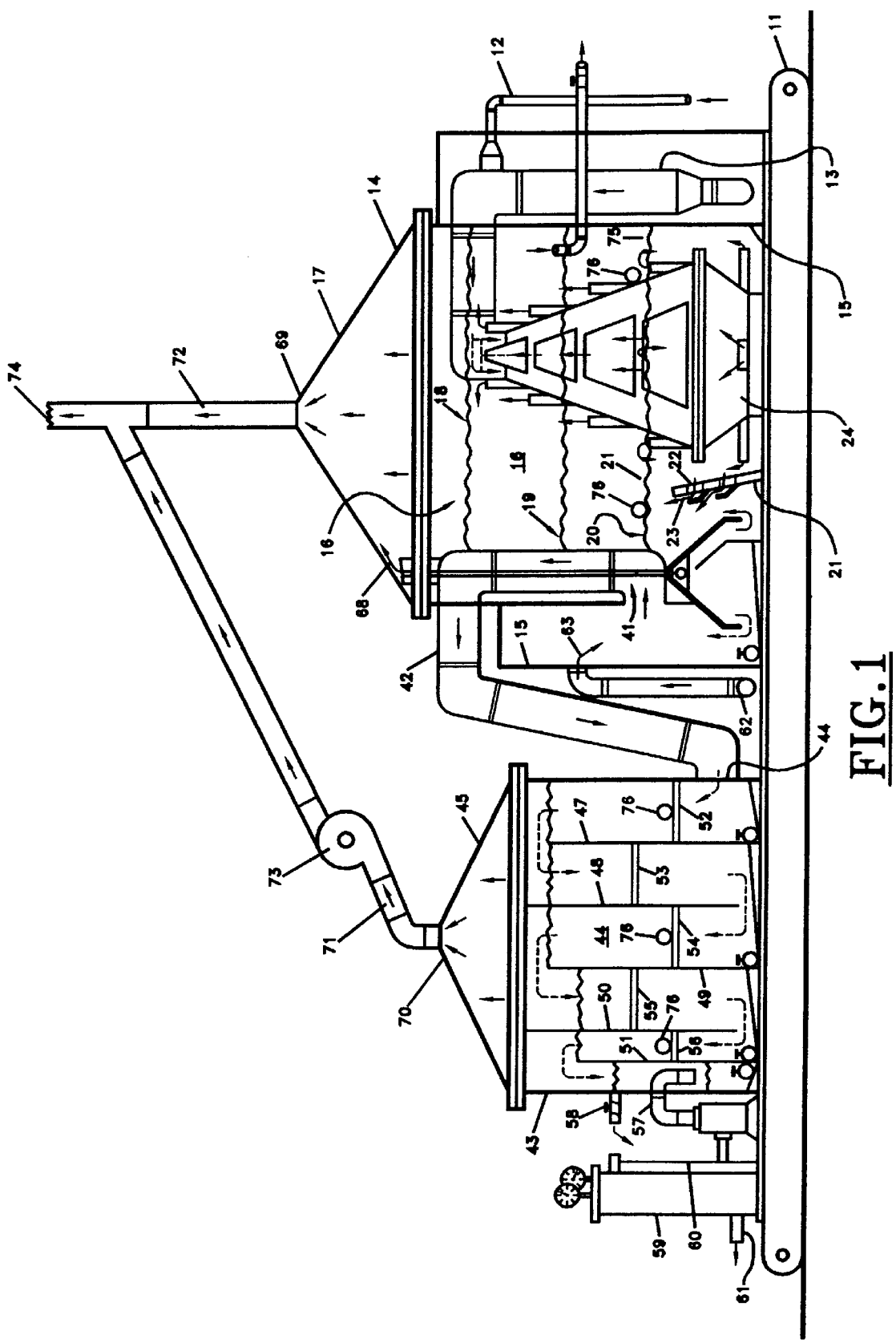
FIG. 1 is an elevational view of the preferred embodiment of the apparatus of the present invention.
Figure 2:
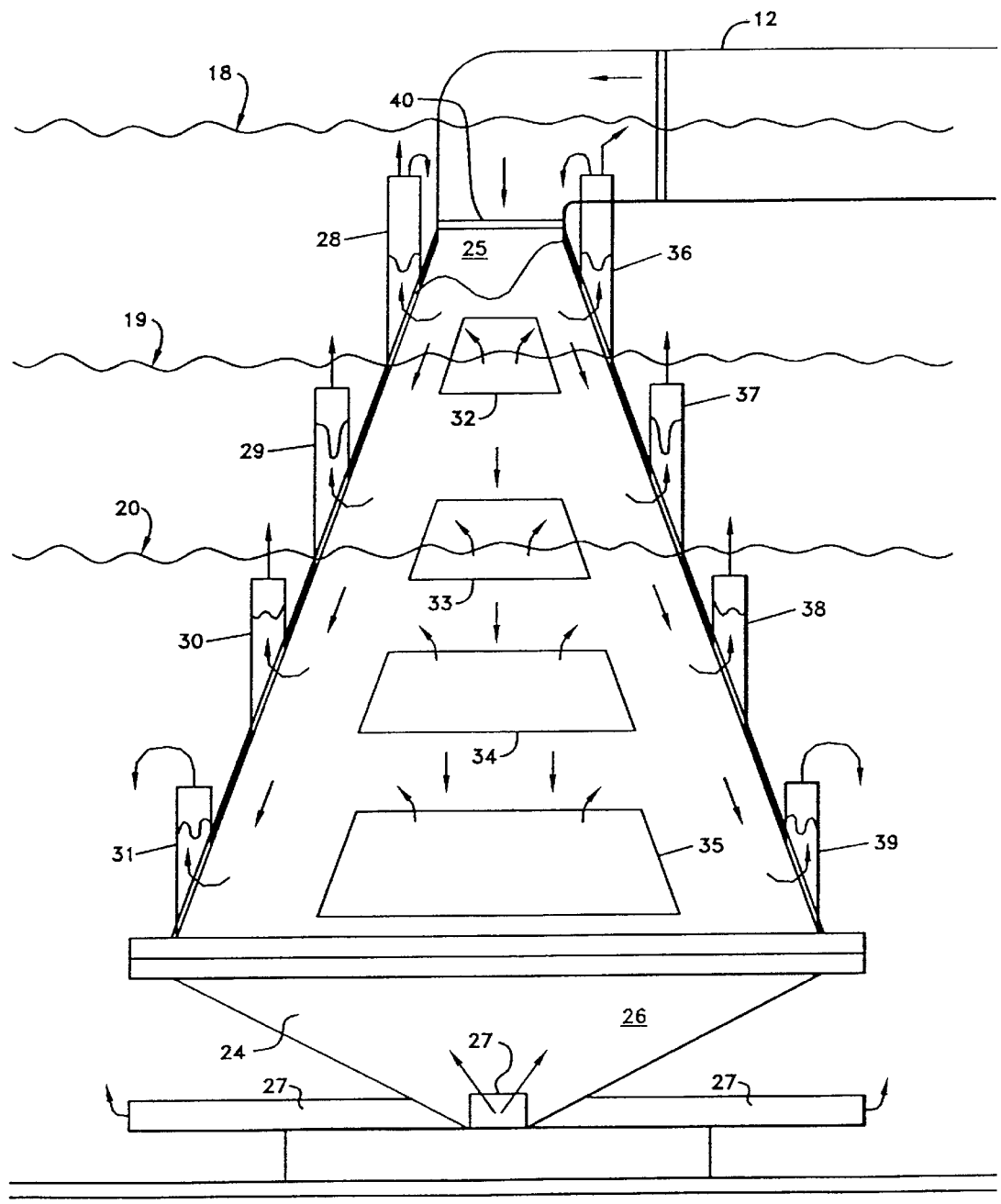
FIG. 2 is a fragmentary elevational view of the preferred embodiment of the apparatus of the present invention illustrating the separator unit portion.
Figure 3:
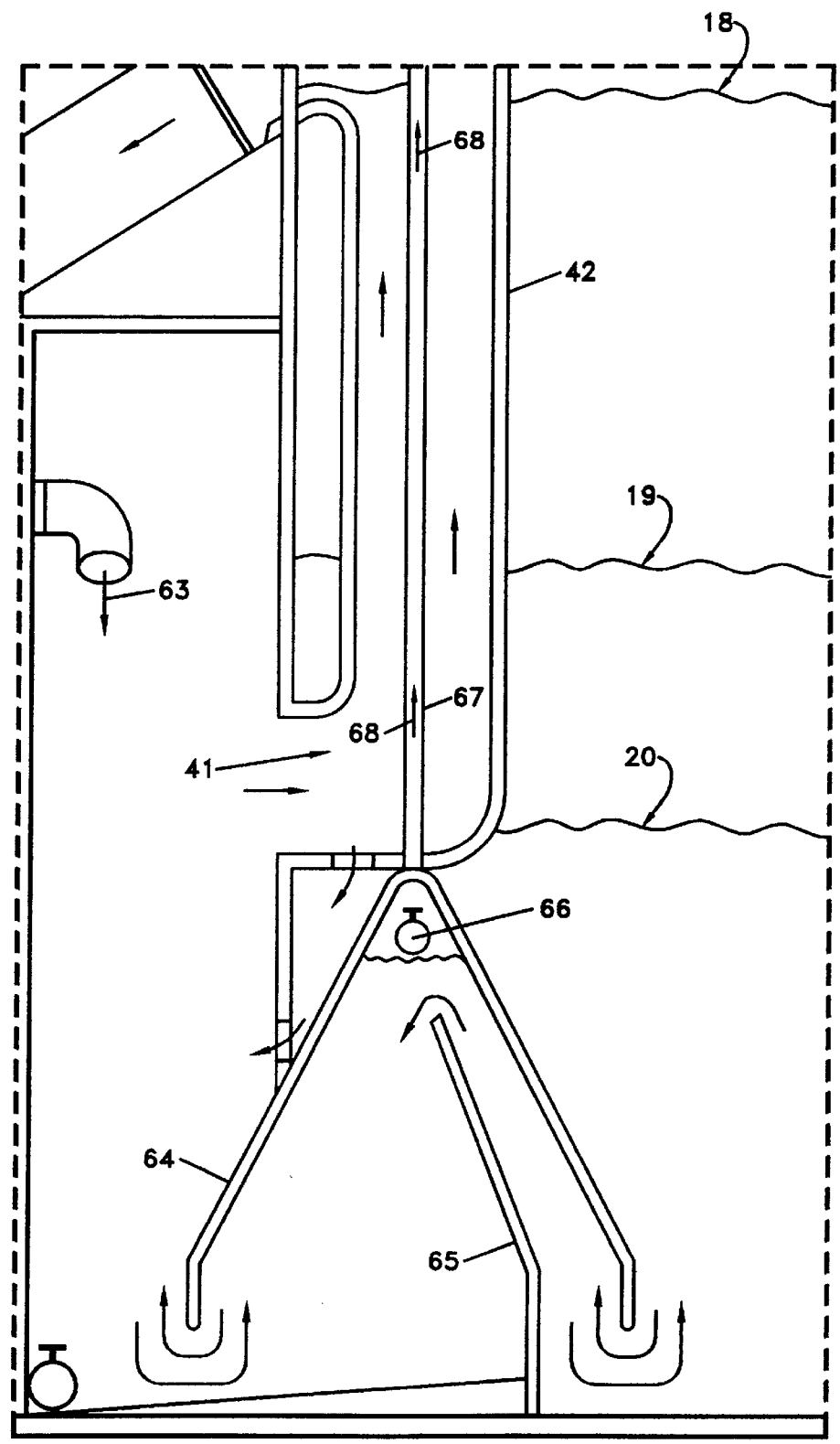
FIG. 3 is a fragmentary elevational view of the preferred embodiment of the apparatus of the present invention illustrating a second separator unit portion thereof.

FIGS. 1–3 show the preferred embodiment of the apparatus of the present invention designated generally by the numeral 10. Oil-water-gas separating apparatus includes a support frame 11 that can be transported from one job location to another as desired. A main inlet flow line 12 carries selected waste water stream to surge tank 13 and then to primary vessel 14. A main mixture inlet 13 can communicate with the main inlet 12 so that multiple streams of waste water can be conveyed to the primary vessel 14.

The primary vessel 14 comprises a continuous outer wall 15 that defines an interior 16 for containing liquid. Cover 17 forms a seal over the vessel 14 and its interior 16 so that gas can be accumulated at the upper portion of the vessel 14 adjacent to cover 17.

During use, liquid is transmitted via main inlet 12 and secondary inlet 13 to interior 16 and vessel 14. Within the vessel interior 16, multiple levels of fluid are defined as the oil and the water stratify. In FIGS. 1 and 2, an oil level is indicated as 18, that being the uppermost fluid level within interior 16. Oil that stratifies is concentrated at oil level 18 for recycling.

The level 19 defines the upper level of a oil and water mixture that is positioned immediately below the pure oil level 18.

Below the pure oil level 18 and the mixed oil/water level 19, arrow 20 indicates the pure water level. Thus, the heaviest liquid within the interior 16 of vessel 14 is water, and it assumes the lowest level within interior 16 of vessel 14.

Baffle 21 extends transversely across vessels 14 interior to prevent the flow of oil to outlet 41. Baffle 21 has openings 22 that allow fluid flow as shown by arrows 23 through openings 22. Otherwise, fluid that strikes the baffle 21 travels upwardly in interior 16 to stratify into oil and water levels as aforedecribed.

Separating unit 24 has an upper end portion 25 and a lower end portion 26. A plurality of water outlet pipes 27 are positioned at lower end portion 26 of separator unit 24. Separator unit 24 is in the form of a conically shaped wall 24A that has a plurality of vertical outlet conduits 28–39 spaced over wall 24A as shown in FIG. 2. Each of the outlet conduits 28–39 is generally trapezoidally shaped so that the bottom of each outlet conduit 28–39 is wider than the top. This functions to accumulate and gather oil droplets together as they move upwardly during stratification.

Inlet 40 defines the connection between main inlet line 12 and separator unit 24. Outlet 41 allows treated water to exit vessel 14 and enter a second vessel 43 via outlet flow line 42. Vessel 43 has an inlet 44 and a continuous outer sidewall 43A and is generally cylindrically shaped. As with vessel 14, vessel 43 has a cover 45 and an interior 46 for containing liquid. A series of parallel, vertically oriented baffles 47–51 create a circuitous path for water that travels through the interior 46 as shown in FIG. 1. A plurality of transversely extending, generally horizontal filters 52, 56 are positioned to span between adjacent baffles and/or between a baffle and the side wall 43A of vessel 43 as shown in FIG. 1. Outlet pipe 57 empties water from interior of vessel 43 after it has been treated with baffles 47–51 and filters 52–56.

Level control valve 58 can be used to control the level of fluid within the interior 46 of vessel 43. Final filtration units 59, 60 can be used to further clarify liquid that exits vessel 43 via outlet pipe 47. The final discharge line 61 provides treated water that leaves filter units 59, 60. As an optional feature, makeup water line 62 can be used to add water to the interior 16 of vessel 14 as shown by arrow 63 in FIG. 1.

A second separator 64 can optionally be provided to the interior 16 of vessel 14. Separator 64 extends transversely across interior 16 of vessel 14. Separator 64 is of an inverse V-shape in cross section and can provide a baffle 65 to discourage the flow of oil to outlet 41. An oil collection pipe 66 can be positioned within separator 64 for withdrawing any oil that accumulates at the upper end portion of the separator 64.

The apparatus 10 of the present invention provides a plurality of ducts for removing gas from the waste water stream that is transmitted to the apparatus 10. In that regard, gas conveying ducts 67, 69 and 70 are provided, all of which accumulate gas for communication to outlet 74. The duct 71 is connected to vessel 44 at outlet 69. The duct 72 is connected to vessel 14 at outlet 69. One or more blowers 73 can be utilized to properly ventilate each of the treatment vessels 14, 43 as shown in FIG. 1. Air jets 76 can be positioned at various locations as seen in FIG. 1. In FIG. 1, one or more oil probes 75 can be positioned to detect the presence of accumulated oil.

PARTS LIST

The following is a list of suitable parts and materials for the various elements of the preferred embodiment of the present invention.

| Part Number | Description |
| --- | --- |
| 10 | oil-water separating apparatus |
| 11 | support frame |
| 12 | main inlet flow line |
| 13 | surge tank |
| 14 | vessel |
| 15 | wall |
| 16 | interior |
| 17 | cover |
| 18 | oil level |
| 19 | mixed oil/water level |
| 20 | water level |
| 21 | baffle |
| 22 | openings |
| 23 | arrow |
| 24 | separator unit |
| 24A | conical wall |
| 25 | upper end portion |
| 26 | lower end portion |
| 27 | water outlet pipe |
| 28 | vertical outlet pipe |
| 29 | vertical outlet pipe |
| 30 | vertical outlet pipe |
| 31 | vertical outlet pipe |
| 32 | vertical outlet pipe |
| 33 | vertical outlet pipe |
| 34 | vertical outlet pipe |
| 35 | vertical outlet pipe |
| 36 | vertical outlet pipe |
| 37 | vertical outlet pipe |
| 38 | vertical outlet pipe |
| 39 | vertical outlet pipe |
| 40 | inlet |
| 41 | outlet |
| 42 | outlet flow line |
| 43 | vessel |
| 43A | cylindrical wall |
| 44 | inlet |
| 45 | cover |
| 46 | interior |
| 47 | baffle |
| 48 | baffle |
| 49 | baffle |
| 50 | baffle |
| 51 | baffle |
| 52 | filter |
| 53 | filter |
| 54 | filter |
| 55 | filter |
| 56 | filter |
| 57 | outlet pipe |
| 58 | level control valve |
| 59 | filter |
| 60 | filter |
| 61 | discharge |
| 62 | make up water line |
| 63 | arrow |
| 64 | separator cone |
| 65 | baffle |
| 66 | oil collection pipe |
| 67 | gas duct |
| 68 | arrow |
| 69 | outlet |
| 70 | outlet |
| 71 | duct |
| 72 | duct |
| 73 | blower |
| 74 | outlet |
| 75 | oil water probe |
| 76 | air jets |

The foregoing embodiments are presented by way of example only; the scope of the present invention is to be limited only by the following claims.

I claim:

1. A oil and water separation apparatus comprising:

a) an incoming flowline for carrying an oil containing waste water stream to be treated;

b) a first treatment vessel having an interior for holding liquid, a flow inlet and a flow outlet, the incoming flowline entering the first vessel at the upper portion thereof;

c) a second treatment vessel having an interior for holding liquid, a flow inlet and a flow outlet, the flow inlet of the second vessel communicating with the flow outlet of the first vessel so that effluent of the first vessel enters the second vessel;

d) a separator unit positioned in the interior of the first vessel and surrounded by fluid contained within the interior of the first vessel, the separator unit having upper and lower end portions, receiving oil containing waste water fluid from the incoming flowline;

e) the separator unit being generally cone shaped and having spaced apart inclined wall portions that have a plurality of openings that are spaced vertically and circumferentially about the inclined walls and at intervals spaced between said upper and lower end portions;

f) the separator unit having an upper inlet that receives waste water from the incoming flowline and wherein incoming flow travels downwardly in said separator unit;

g) said openings being positioned below the upper inlet of the separator unit;

h) said openings defining outlets for discharging oil that collects within said separator and that accumulates on and next to said inclined wall portions so that the oil exiting said openings is contained within said first vessel and externally of said separator;

i) wherein oil and water can stratify within the interior of the first vessel;

j) an oil discharge line for removing oil from the interior of the first vessel that has separated by stratifying from other fluid contained within the first vessel.

2. The apparatus of claim 1 further comprising a second treatment vessel contained within the first vessel, the second treatment unit being positioned to receive fluid below the oil that has separated by stratifying, the second treatment unit having a flow inlet and a flow outlet.

3. The apparatus of claim 1 further comprising a gas collection flowline for removing gas that rises to the top of either vessel.

4. The apparatus of claim 1 further comprising a gas flowline extending from the top of the second treatment unit for transmitting gas that accumulates in the second treatment unit to the top of the first vessel.

5. The apparatus of claim 1 wherein the first treatment unit has separator openings positioned at three separate elevational positions.

6. The apparatus of claim 1 wherein oil contained within the interior of the separator unit engages and travels along an interior surface of the inclined wall of the first treatment unit until said oil reaches an opening.

7. The apparatus of claim 1 wherein the first treatment vessel has a lower end portion with a fluid outlet for discharging fluid that is heavier than oil into the interior of the first vessel.

8. The apparatus of claim 1 wherein each of the separator openings has a lower end portion and an upper end portion, the lower end portion being larger than the upper end portion.

9. The apparatus of claim 8 wherein the openings comprise conduits that extend vertically from the wall portions of the separator unit.

10. A oil and water separation apparatus comprising:

a) an incoming flowline for conveying an oil containing waste water stream to be treated;

b) a treatment vessel having an outer wall, an interior for holding liquid, a flow inlet and a flow outlet;

c) a separator unit positioned in the interior of the treatment vessel and surrounded by fluid contained within the interior of the first vessel, the separator unit receiving oil containing waste water fluid from the incoming flowline;

e) the separator unit having an outer circumferentially extending inclined wall, an upper end portion, a lower end portion, a fluid containing interior and being tapered between upper and lower end portions, the upper end portion being smaller in transverse cross section and the lower end portion being larger in transverse cross section;

f) a plurality of separator openings in the wall of the separator unit including openings that are spaced vertically and circumferentially about the inclined walls;

g) the separator unit having an upper inlet that receives waste water from the incoming flowline so that incoming fluid flows downwardly in the separator unit;

h) the separator openings being positioned below the upper inlet of the separator unit;

i) said openings defining outlets for discharging oil that collects within said separator and that accumulates on and next to said inclined wall portions so that the oil exiting said openings is contained within said first vessel and externally of said separator;

j) wherein oil and water can stratify within the interior of the first vessel externally of the separator unit; and k) an oil discharge line for removing oil from the interior of the first vessel that has separated by stratifying from other fluid contained within the first vessel.

11. A oil and water separation apparatus comprising:

a) an incoming flowline for conveying an oil containing waste water stream to be treated;

b) a treatment vessel having an outer wall, an interior for holding liquid, a flow inlet and a flow outlet;

c) a separator unit positioned in the interior of the treatment vessel and surrounded by fluid contained within the interior of the first vessel, the separator unit receiving oil containing waste water fluid from the incoming flowline, so that the waste water stream preliminarily enters the interior of the separator unit;

d) the separator unit having an outer circumferentially extending inclined wall, an upper end portion, a lower end portion, a fluid containing interior and being tapered between upper and lower end portions, the upper end portion being smaller in transverse cross section and the lower end portion being larger in transverse cross section;

e) a plurality of separator openings in the wall of the separator unit including openings that are spaced vertically and circumferentially about the inclined wall;

f) the separator unit having an upper inlet that receives waste water from the incoming flowline and wherein incoming fluid flows downwardly in said separator unit;

g) the majority of the openings being positioned below the upper inlet of the separator unit;

h) said openings defining outlets for discharging oil that collects within said separator and that accumulates on and next to said inclined wall portions so that the oil exiting said openings is contained within said first vessel and externally of said separator;

i) wherein oil and water stratifies within the interior of the first vessel externally of said separator; and j) an oil discharge line for removing oil from the interior of the first vessel that has separated by stratifying from other fluid contained within the first vessel.

* * * * *